US008569617B2

(12) United States Patent
Beutel et al.

(10) Patent No.: US 8,569,617 B2
(45) Date of Patent: Oct. 29, 2013

(54) ENCAPSULATION HOUSING REDUCING PIECE

(75) Inventors: Stefan Beutel, Berlin (DE); Andreas Kleinschmidt, Oranienburg (DE)

(73) Assignee: Siemens Aktiengesellschaft, Munich (DE)

(*) Notice: Subject to any disclaimer, the term of this patent is extended or adjusted under 35 U.S.C. 154(b) by 60 days.

(21) Appl. No.: 13/262,772

(22) PCT Filed: Mar. 29, 2010

(86) PCT No.: PCT/EP2010/054107
§ 371 (c)(1),
(2), (4) Date: Oct. 3, 2011

(87) PCT Pub. No.: WO2010/112462
PCT Pub. Date: Oct. 7, 2010

(65) Prior Publication Data
US 2012/0037395 A1    Feb. 16, 2012

(30) Foreign Application Priority Data

Apr. 1, 2009  (DE) .................... 10 2009 015 539

(51) Int. Cl.
*H05K 5/03*  (2006.01)
(52) U.S. Cl.
USPC .............................. 174/50; 439/535; 248/906

(58) Field of Classification Search
USPC ............ 174/50; 439/535; 248/906; 220/4.02
See application file for complete search history.

(56) References Cited

U.S. PATENT DOCUMENTS 6,560,091 B1   5/2003  Takahoshi et al.
2006/0243703 A1  11/2006  Meinherz

FOREIGN PATENT DOCUMENTS

| DE | 7243233 U | 3/1973 |
| DE | 2557644 A1 | 6/1977 |
| DE | 29806652 U1 | 6/1998 |
| DE | 10254385 B3 | 3/2004 |
| DE | 10325685 A1 | 12/2004 |
| DE | 102006001237 A1 | 7/2007 |
| DE | 69937009 T2 | 4/2008 |
| FR | 2777128 A1 | 10/1999 |
| FR | 2874122 A1 | 2/2006 |
| FR | 2911014 A1 | 7/2008 |

*Primary Examiner* — Dhirubhai R Patel
(74) *Attorney, Agent, or Firm* — Laurence A. Greenberg; Werner H. Stemer; Ralph E. Locher

(57) ABSTRACT

An encapsulation housing reducing piece has a first flange and a second flange. The second flange has a reduced cross-section compared to the first flange. An encapsulation housing shell extends between the two flanges. The encapsulation housing shell has a plurality of even zones. Rotation symmetrical shell surface sections are arranged between the even zones.

13 Claims, 6 Drawing Sheets

ENCAPSULATION HOUSING REDUCING PIECE

BACKGROUND OF THE INVENTION

Field of the Invention

The invention relates to an encapsulation housing reducing piece having a first flange and a second flange whose cross section is smaller than that of the first flange and between which an encapsulation housing casing extends.

An encapsulation housing reducing piece such as this is known, for example, from German Utility Model DE 298 06 652 U1. This describes an encapsulated three-phase circuit breaker, to which encapsulation module are connected. One of the encapsulation module is in the form of an encapsulation housing reducing piece which has a first flange and a second flange whose cross section is smaller than that of the first flange. An encapsulation housing casing is arranged between the first and the second flanges. The known encapsulation housing reducing pieces are preferably used to hold current transformers. Various types of combinations of differently shaped encapsulation housing reducing pieces are provided for this purpose. In order to reduce procurement costs, it is advantageous to use a large number of standard components.

BRIEF SUMMARY OF THE INVENTION

The object of the invention is therefore to design an encapsulation housing reducing piece so as to allow the encapsulation housing reducing piece to be used universally.

According to the invention, this is achieved for an encapsulation housing reducing piece of the type mentioned initially in that a plurality of planar zones are arranged in the encapsulation housing casing, between which casing surface sections are arranged rotationally symmetrically.

By way of example, encapsulation housing reducing pieces are used on gas-insulated switchgear assemblies. Gas-insulated switchgear assemblies have fluid-tight encapsulation housings in whose interior active conductors are arranged. Active conductors are used to carry an electric current. For this purpose, the active conductors are positioned in an electrically isolated form at a distance from the encapsulation housings, and in the interior thereof. In order to ensure electrical isolation between the active conductors and the encapsulation housings, the interior is filled with an electrically insulating fluid. This fluid is preferably an insulating gas at a raised pressure, such as sulfurhexafluoride. An encapsulation housing reducing piece is a fluid-tight encapsulation housing.

Encapsulation housings surround the active conductors in a fluid-tight manner, such that the electrically insulating fluid can be kept in the interior of the encapsulation housing. If required, electrically insulating bushings may be used to pass active conductors through a wall of the encapsulation housing. By way of example, bushings such as these can be arranged in the region of flanges of the encapsulation housing reducing piece.

The encapsulation housing casing extends between the first and the second flanges. In this case, the encapsulation housing casing is designed to provide a connection at a fixed angle between the two flanges via the encapsulation housing casing. The alignment of the flanges should preferably be chosen such that the flange surfaces of the two flanges are approximately parallel to one another.

Ring flanges which are located coaxially with respect to one another can advantageously be used as flanges. The flanges are preferably located coaxially with respect to a longitudinal axis of the encapsulation housing reducing piece. A fluid-tight junction is in each case formed between the encapsulation housing casing and the flanges. A volume which is used to form a fluid area is bounded in the interior of the encapsulation housing reducing piece.

A configuration of the encapsulation housing casing with a plurality of zones which are planar, with these zones being connected to one another via rotationally symmetrical casing surface sections which are arranged coaxially with respect to one another, results in a volume with a triangular cross-sectional area at least in places, in the interior of the accommodation area of the encapsulation housing reducing piece, with the corners of the triangular cross-sectional area being rounded. At least in places, the interior of the encapsulation housing reducing piece is therefore in the form of a cylindrical accommodation area, whose end faces have triangular cross sections, whose corners are broken by rounded areas. The planar zones and the rotationally symmetrical casing surface sections are connected to one another in a fluid-tight manner and together form at least one circumferential section of the encapsulation housing casing of the encapsulation housing reducing piece. The encapsulation housing casing connects the two flanges to one another in a fluid-tight manner, thus producing a closed channel between flange openings of the flanges.

Particularly when encapsulation housing reducing pieces such as these are used in polyphase gas-insulated switchgear assemblies, which in each case hold active conductors for a plurality of phases of an electrical power transmission system in the encapsulation housings, these active conductors can on the one hand be arranged such that they are electrically isolated from one another, or on the other hand they can be arranged in a triangle with respect to one another, in particular when three phases are present. This results in an accommodation area of adequate size in the interior of the encapsulation housing reducing piece, which makes an adequate volume available to accommodate active conductors of the three phases, and has a smaller internal volume than conventional circular cylindrical accommodation areas, because of the planar zones. This reduces the amount of fluid required to fill the interior of the encapsulation housing reducing piece, for example sulfurhexafluoride gas, nitrogen gas or other gas mixtures. In comparison to an encapsulation housing casing with a conventional circular cross section, restrictions can admittedly be expected with respect to the pressure resistance, but adequate pressure strengths can be achieved with suitable choice of the material to form the encapsulation housing reducing piece. For example, this makes it possible for the encapsulation housing reducing piece to be in the form of a casting, in which case metals such as ferrous or non-ferrous metals, in particular aluminum alloys, can be used as casting material. On the one hand, the use of metals to form the encapsulation housing reducing piece results in a mechanically robust body. On the other hand, it is possible to apply ground potential in a similar manner to the encapsulation housing reducing piece. For example, this makes it possible to design gas-insulated switchgear assemblies whose external surfaces are at ground potential, thus ensuring reliable direct-contact protection for the active conductors which are located in the interior of the encapsulation housings.

It is advantageously also possible for at least one, and in particular all, of the planar zones to merge via a bending edge into a circular section which is connected to the first flange.

The encapsulation housing reducing piece can be extended radially via the circular sections. The circular sections ensure a fluid-tight junction between the zones to the first flange, which is preferably a circular flange. The circular arc of the circular section abuts against the first flange. Surface normals of one zone and of an adjacent circular section should preferably be essentially at right angles to one another. The bending edge runs parallel to a chord of the circular section. The ends of the circular arc of the circular section abut against junctions of the rotationally symmetrical casing surface sections which abut against the adjacent planar zone. Junctions between the first flange and the rotationally symmetrical surface sections are in the form of angles, in which case a path of the angles in the junction or abutting areas runs coaxially with respect to the profile of the rotationally symmetrical casing surface sections, and to the first flange.

It is also advantageously possible for the zones to be distributed symmetrically in the circumference of the casing surface sections.

A symmetrical distribution of the zones in the encapsulation housing casing results in an equilateral triangular cross section with correspondingly rounded broken corners in the section of the encapsulation housing reducing piece. Particularly in a combination of the encapsulation housing reducing piece, for example with encapsulation housings which have essentially circular cross sections and therefore provide at least essentially circular cylindrical accommodation areas in their interior, this therefore results in a simple combination capability. This allows the encapsulation housing reducing piece to be designed symmetrically and allows it to be inserted into the external contours of conventional circular encapsulation housing sections. The rotationally symmetrical casing surface sections should preferably lie on one and the same path, such that the accommodation area has an at least essentially symmetrical form.

It is advantageous for the cylindrical volume having a triangular cross section with rounded corners at one of its ends to merge with a reduced cross section in the direction of the second flange into a rotationally symmetrical casing surface which abuts against the second flange. At the other end, the volume having the triangular cross section with rounded corners in the direction of the first flange should merge as an extension into the first flange. In a projection in the direction of the longitudinal axis, the cross section of the first flange overhangs the triangular cylindrical section of the encapsulation housing casing while, in contrast, on the same projection, the triangular cylindrical section of the encapsulation housing casing overhangs the second flange.

A further advantageous refinement allows the zones to be formed by flats on a circular cylindrical casing.

By way of example, the zones may be designed such that an essentially circular cylindrical casing is provided with appropriate flats in the area of the casing, as a result of which, seen in cross section for example, the zones represent chords in a circular cross section, thus defining a flattened zone.

A flat on a circular cylindrical casing, which was originally part of a circular cylinder, on the one hand reduces the volume of the accommodation area available in the interior. This reduces the amount of fluid required to fill the interior of the encapsulation housing reducing piece, in comparison to conventional encapsulation housings having a circular cross section. Furthermore, this makes it possible, for example, to distribute transformer cores symmetrically around a longitudinal axis of the encapsulation housing reducing piece. Particularly in the case of essentially hollow-cylindrical transformer cores, through which active conductors of a polyphase electrical power transmission system pass, this makes it possible to effectively use the space created, since the encapsulation housing is matched to the shape of the fittings, and corners can advantageously be filled with fittings.

It is also advantageously possible for the zones to be formed as depressed indentations into a circular cylindrical casing section.

Impression of the zones into the casing surface sections makes it possible to produce planar surfaces between casing surface sections which overhang them, which surfaces can be used to accommodate attachments and fittings. The casing surface sections therefore offer protection to the depressed planar zones.

It is also advantageously possible for the zones to be formed by projections on a circular cylindrical casing section.

The planar zones overhang the casing surface sections when they are lifted out of the latter. A configuration such as this can easily be retrofitted to existing encapsulation housing reducing pieces as well, since additional attachments are fitted to the existing structures, in order to form the planar zones.

A further advantageous refinement allows a flange opening to be arranged in at least one of the zones.

A flange opening makes it possible to intervene in the interior of the encapsulation housing reducing piece, even when the first and/or the second flange are/is flange-connected to further assemblies. For example, this makes it possible to carry out fitting tasks in the interior of the encapsulation housing reducing piece via a flange opening in a planar zone. A flange opening can advantageously be arranged in each of the zones. In this case, the flange opening can preferably have a circular opening cross section, which is surrounded by an annular flange. Further assemblies can then be flange-connected to the annular flange, whilst allowing the flange opening to be completed and closed in a fluid-tight manner, as required.

By way of example, a flange opening can be closed in a fluid-tight manner by a blank cover.

It is advantageously possible for the flange opening to be closed by an overpressure protection device.

The interior of the encapsulation housing reducing piece is filled with a pressurized fluid. By way of example, a fluid such as this is a gas or a liquid. A pressurized fluid in the interior of the encapsulation housing reducing piece generally results in a pressure difference with respect to a medium surrounding the encapsulation housing reducing piece, with the pressure of the medium surrounding the encapsulation housing generally being less than the pressure in the interior of the encapsulation housing reducing piece. Unpredicted external influences or disturbances can lead to an overpressure in the interior of the encapsulation housing reducing piece, as a result of which the encapsulation housing reducing piece may be destroyed, or people may be endangered. In order to avoid greater damage in these cases, an overpressure protection device can be fitted to a flange opening in one zone, thus closing the flange opening. If the pressure in the interior of the encapsulation housing reducing piece becomes excessive, fluid can be let out of the interior into the area surrounding the encapsulation housing reducing piece via the overpressure protection device, when a pressure limit is reached.

A further advantageous refinement allows the flange opening to be closed by a measurement line bushing.

Particularly when using the encapsulation housing reducing piece for holding a measurement device with appropriate measurement sensors such as coils, capacitors, optical waveguides etc., it is advantageous to transmit information which has been obtained by the measurement sensors through the encapsulation housing to the exterior. In this case, transmission should take place through the encapsulation housing in a manner which is as fluid-tight as possible. This is enabled by a measurement line bushing. The measurement line bushing may, for example, be flange-connected via a flange opening in one of the zones.

It may also be advantageous to close the flange opening with a filter cover.

The interior of the encapsulation housing is filled with an electrically insulating fluid. When arcs or the like occur, the electrically insulating fluid may decompose, resulting in decomposition products which can disadvantageously influence the electrical insulation capability of the fluid. Closing the flange opening with a filter cover makes it possible to filter out such decomposition products from the fluid. For this purpose, the filter cover is fitted in a fluid-tight manner to the flange opening, and has an accommodation area for holding a filter material on a wall which allows access to the interior of the encapsulation housing.

A connection of the filter material to the filter cover makes it possible to replace the filter material in a simple manner by opening the flange opening after several years of operation, and to close the encapsulation housing again in a fluid-tight manner after the filter material has been replaced.

Flange openings which are located in the planar zones of an encapsulation housing reducing piece can be closed in different ways, depending on the requirement.

Furthermore, it is advantageously possible to flange-connect two encapsulation housing reducing pieces of the same type to one another by their first flanges, and for them to jointly bound a fluid area.

Flange connection of encapsulation housing reducing pieces of the same type makes it possible to form a fluid area which has the respective second flanges of the two encapsulation housing reducing pieces at the end and can be connected via them to further encapsulation housings. The two encapsulation housing reducing pieces therefore provide a larger accommodation area/fluid area. In this case, provision should advantageously be made for the planar zones to be aligned with respect to one another, with respect to the longitudinal axis of the encapsulation housing reducing pieces.

A further advantageous refinement allows the first flange of an encapsulation housing reducing piece to be closed by a cover which has a plurality of attachments on its circumference, which attachments radially overhang the first flange, and the encapsulation housing reducing piece is supported on them.

In addition to using an encapsulation housing reducing piece for holding a current transformer, an encapsulation housing reducing piece such as this can also be used to form an interface for cable bushings into the interior of a gas-insulated switchgear assembly. The use of a cover to close the first flange makes it possible to introduce openings into the cover, which are used to hold a cable bushing, for example in the form of a cable plug connection. A cable plug connection such as this has a cable socket and a cable plug, with the cable socket being connected by a fixed angle and in a fluid-tight manner to the cover, and having at least one electrically insulating section of a fluid-tight wall of a fluid area which is bounded by the encapsulation housing reducing piece. In this case, it is advantageous for the cover to have the same number of openings and corresponding cable sockets as the number of planar zones that the encapsulation housing reducing piece has. The attachments which overhang the first flange make it possible to attach holders for positioning the encapsulation housing reducing piece to these attachments, thus stabilizing the encapsulation housing reducing piece in its position.

In this case, it is possible for cable bushings to pass through the cover.

Cable bushings are required in order to insert the electrical conductors of electrical cables into the interior of a gas-insulated switchgear assembly. In the interior of the gas-insulated switchgear assembly, electrical insulation of the active conductors is ensured by the electrically insulating fluid located there. Outside the gas-insulated switchgear assembly, and therefore outside the encapsulation housing reducing piece, the electrical insulation of the active conductors of an electrical power transmission system is ensured by an insulation layer on the cable. Cable bushings are used on the one hand for inserting a cable into the interior of the encapsulation housing reducing piece. On the other hand, the cable bushings are used to control an electrical field around the cable ends which are located in the area of the cable bushings. In this case, by way of example, a cable bushing has a cable socket and a cable plug, with the cable plug being inserted into the cable socket, where an electrical interface is produced between the electrical conductor of the cable and an active conductor in the interior of the encapsulation housing reducing piece. In this case, the cable socket is part of a fluid-tight wall of the encapsulation housing reducing piece, and prevents electrically insulating fluid emerging from the encapsulation housing reducing piece.

BRIEF DESCRIPTION OF THE SEVERAL VIEWS OF THE DRAWING

One exemplary embodiment of the invention will be described in more detail in the following text and is illustrated schematically in a drawing, in which.

DESCRIPTION OF THE INVENTION

Figure 1:
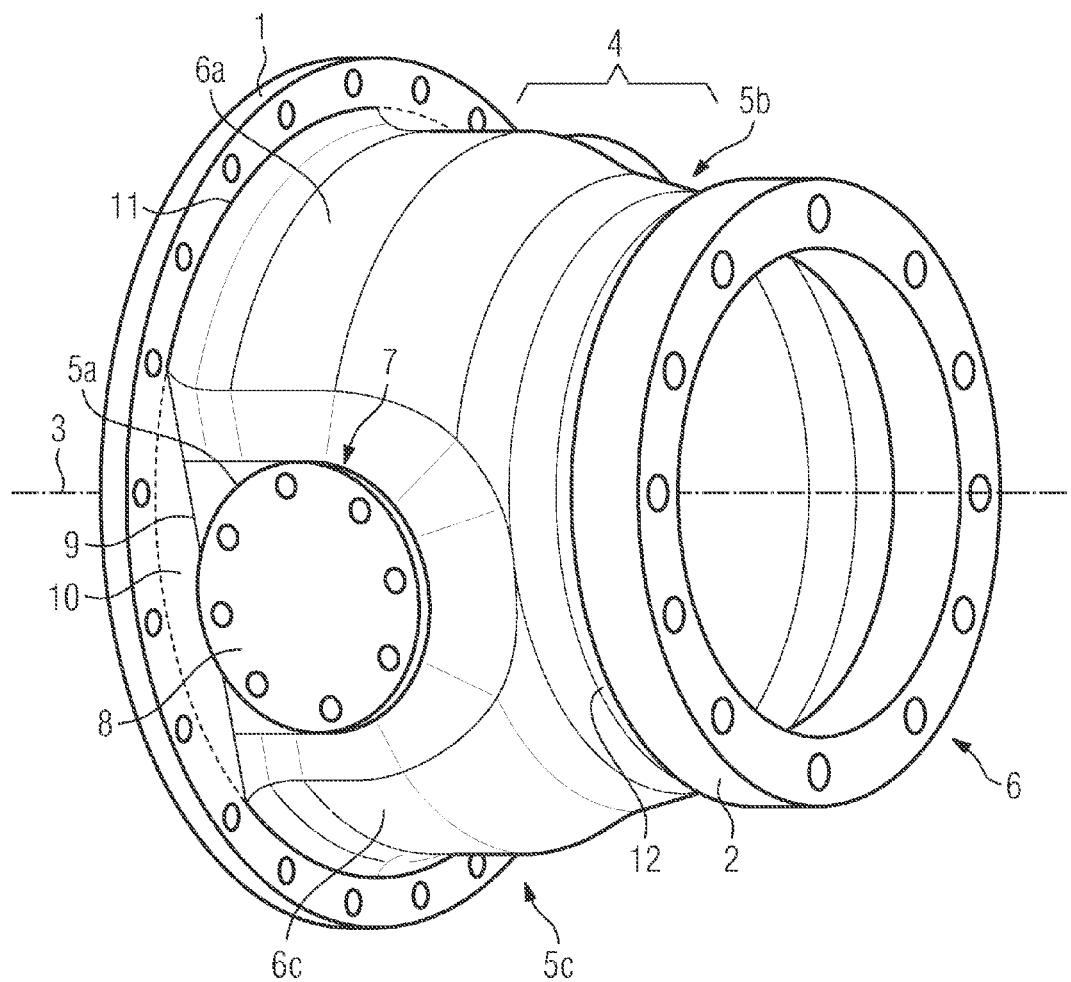
FIG. 1 shows a perspective view of an encapsulation housing reducing piece.

FIG. 1 shows a perspective view of an encapsulation housing reducing piece. The encapsulation housing reducing piece has a first flange 1 and a second flange 2. The first and the second flanges 1, 2 are each in the form of ring flanges, which are aligned with their flange surfaces approximately parallel to one another. The two flanges 1, 2 are in this case located coaxially with respect to a longitudinal axis 3 of the encapsulation housing reducing piece. An encapsulation housing casing 4 extends between the mutually facing ends of the two flanges 1, 2. The encapsulation housing casing 4 is connected in a fluid-tight manner to the first and to the second flanges 1, 2, and forms a fluid-tight channel, running around the longitudinal axis 3, between the two flanges 1, 2. The encapsulation housing casing 4 in this case has a first planar zone 5*a*. In addition to the first planar zone 5*a*, a second planar zone 5*b* and a third planar zone 5*c* are arranged distributed symmetrically around the longitudinal axis 3 in the circumference of the encapsulation housing casing 4. Casing surface sections 6*a*, 6*b*, 6*c* which are each located rotationally symmetrically with respect to one another are arranged between the three planar zones 5*a*, 5*b*, 5*c*. The rotationally symmetrical casing surface sections 6*a*, 6*b*, 6*c* are each aligned coaxially with respect to the longitudinal axis 3, with the three rotationally symmetrical casing surface sections 6a, 6b, 6c lying on one and the same circumferential path. The rotationally symmetrical casing surface sections 6a, 6b, 6c respectively abut against the planar zones 5a, 5b, 5c and are connected to them in a fluid-tight manner. Junction areas are formed in the abutment area between the planar zones 5a, 5b, 5c and the respective casing surface sections 6a, 6b, 6c resting thereon, in order to form a rounded surface structure. An accommodation area/fluid area which has an essentially triangular cross section, with the corners of the triangle being rounded, is formed in the interior of the encapsulation housing reducing piece, in the area of the planar zones 5a, 5b, 5c and the rotationally symmetrical casing surface sections 6a, 6b, 6c. The corners are in this case broken by the rotationally symmetrical casing surface sections 6a, 6b, 6c. The sides of the triangular base area are bounded by the planar zones 5a, 5b, 5c. The uniform distribution of the planar zones 5a, 5b, 5c and the casing surface sections 6a, 6b, 6c, which are circumferential in the same way, result in the formation of an equilateral-triangle cross section. This therefore results at least in a section of the accommodation area, which is formed between the two flanges 1, 2, of the encapsulation housing reducing piece being in the form of a cylindrical body with an essentially triangular base area and rounded corners.

Flange openings 7 are provided in each of the planar zones 5a, 5b, 5c. The flange openings 7 are in this case in the form of a circle, with these circles each being surrounded by a flange ring. The flange openings 7 can be closed in a fluid-tight manner via the flange ring which surrounds the flange openings 7. FIG. 1 shows a fluid-tight closure of the flange opening 7 with a blank flange cover 8.

The further flange openings 7 are likewise closed by blank flange covers. However, it is also possible to use different elements to close different flange openings 7, if required. In addition to blank flange covers 8, measurement line bushings, overpressure protection devices or filter covers etc., can also be used as different elements.

At its end facing the first flange 1, the encapsulation housing casing 4 merges into the first flange 1 in a fluid-tight manner. For this purpose, a bending edge 9 is arranged in the area of the planar zones 5a, 5b, 5c for providing a connection for the flange 1. In this case, the normals to the surfaces of the planar zones 5a, 5b, 5c and the normals to the surfaces of the abutting surface of the first flange 1 are aligned essentially at right angles to one another. With respect to the longitudinal axis 3, this results in a radial extension of the planar zones 5a, 5b, 5c onto the first flange 1. A circular section 10 is arranged in the area of each of the planar zones 5a, 5b, 5c and merges via the respective bending edge 9 into a planar zone 5a, 5b, 5c. Curve ends of the circular section 10 merge into a circular path which defines a curved bending edge 11, via which the rotationally symmetrical casing surface sections 6a, 6b, 6c abut against the first flange 1. Bending radii of the curved bending edges 11 between the first flange 1 and the rotationally symmetrical casing surface sections 6a, 6b, 6c are each aligned coaxially with respect to the longitudinal axis 3.

At the end of the encapsulation housing casing which faces the second flange 2, the planar zones 5a, 5b, 5c and the rotationally symmetrical casing surface sections 6a, 6b, 6c merge into a rotationally symmetrical section 12 with a reduced cross section, which section represents a connection for the second flange 2. The rotationally symmetrical section 12 with a reduced cross section is connected in a fluid-tight manner both to the planar zones 5a, 5b, 5c and to the rotationally symmetrical casing surface sections 6a, 6b, 6c, as well as to the second flange 2.

Figure 2:
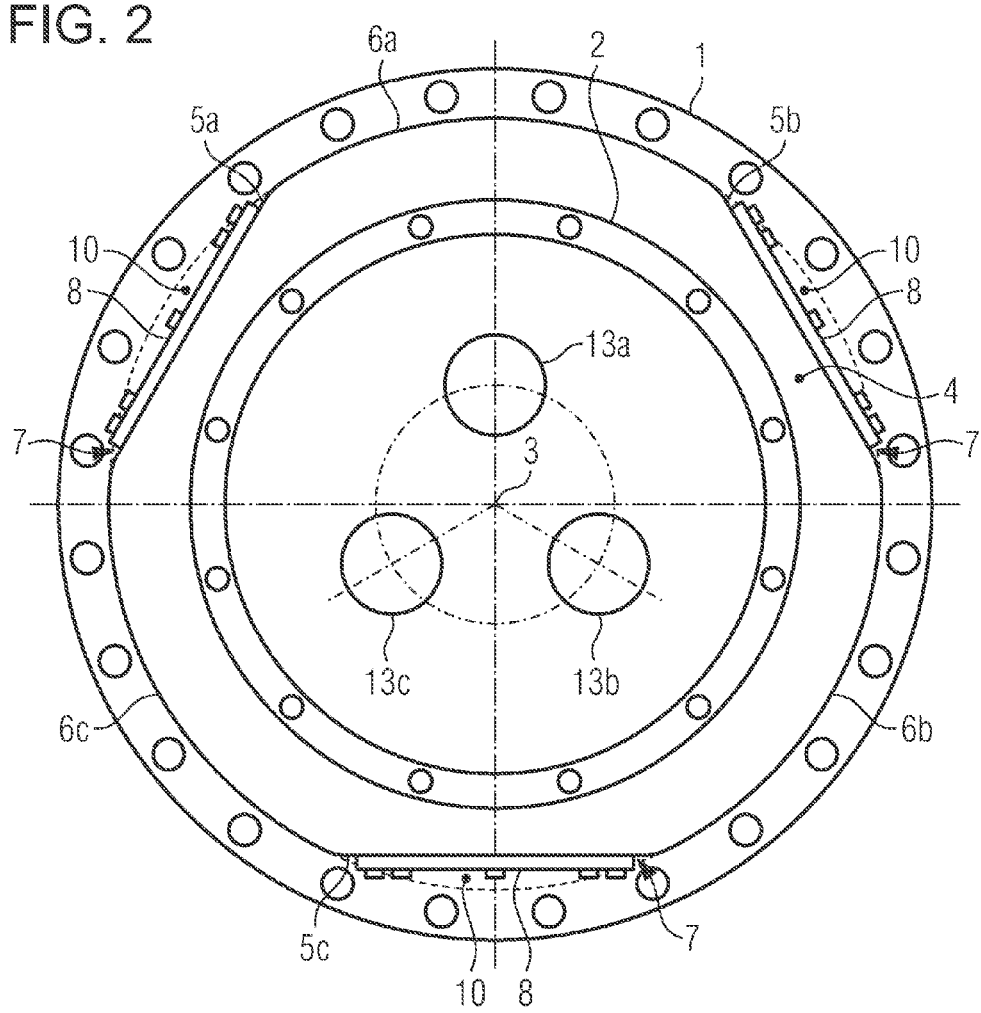
FIG. 2 shows a plan view of a second flange of the encapsulation housing reducing piece.

FIG. 2 shows a plan view of the end of the encapsulation housing reducing piece shown in FIG. 1. In this case, the viewing axis runs along the longitudinal axis 3, looking in the direction of the first flange 1 from the direction of the second flange 2. The longitudinal axis 3 projects at right angles out of the plane of the drawing in FIG. 2. This shows that both the first and the second flanges 1, 2 are arranged coaxially with respect to the longitudinal axis 3, with the flange diameter of the first flange 1 being greater than the flange diameter of the second flange 2. The encapsulation housing casing 4 extends with a first planar zone 5a, a second planar zone 5b and a third planar zone 5c between the two flanges 1, 2. The mutually adjacent circular sections 10 on the planar zones 5a, 5b, 5c can each be seen in the plan view. By way of example, FIG. 2 shows all of the flange openings 7 located in the planar zones 5a, 5b, 5c closed by a blank flange cover 8. The planar zones 5a, 5b, 5c are connected to one another in the circumferential direction via the rotationally symmetrical casing surface sections 6a, 6b, 6c of the encapsulation housing casing. The figure shows a coaxial alignment of the rotationally symmetrical casing surface sections 6a, 6b, 6c with respect to the first flange 1 and the second flange 2. As can be seen, the rotationally symmetrical casing surface sections 6a, 6b, 6c are sections of an (imaginary) continuous rotationally symmetrical casing surface of the encapsulation housing casing. The planar zones 5a, 5b, 5c are formed by flats in this rotationally symmetrical casing surface. The bending edges 9 are therefore chords of circle sections 10 which are illustrated in the projection shown in FIG. 2.

FIG. 2 furthermore symbolically shows the position of active conductors 13a, 13b, 13c, which can be positioned in the interior of the encapsulation housing reducing piece. For clarity reasons, FIG. 2 shows only details of the active conductors 13a, 13b, 13c on the plane on which they pass through the second flange 2. The active conductors 13a, 13b, 13c are arranged distributed on a circular path, in each case defining the corner points of an equilateral triangle on the circular path.

The active conductors 13a, 13b, 13c are arranged such that they are electrically insulated from the encapsulation housing reducing piece. Solid insulators can be provided in order to support the active conductors 13a, 13b, 13c and are supported, for example, on the flanges 1, 2 or on further walls of the encapsulation housing reducing piece. The encapsulation housing reducing piece provides a fluid-tight encapsulation housing casing 4 between the two flanges 1, 2. A fluid-tight termination can also be produced there by flange connection of the flanges 1, 2 to further assemblies. For example, the interior of the encapsulation housing reducing piece can be filled with an electrically insulating fluid, preferably an insulating gas or an insulating oil. In particular sulfurhexafluoride, nitrogen or other suitable insulating gases are suitable as an insulating gas. The fluid can be pressurized in the interior, thus in general additionally improving the electrical strength of the fluid.

The active conductors 13a, 13b, 13c are part of a polyphase electrical power transmission system. In this case, the active conductors 13a, 13b, 13c are each intended to carry an electric current, in which case the phase angles and magnitudes of the currents in the individual active conductors 13a, 13b, 13c may differ.

In order to allow detection of the currents flowing through the active conductors 13a, 13b, 13c, the interior of the encapsulation housing reducing piece is preferably fitted with a current transformer arrangement.

Figure 3:
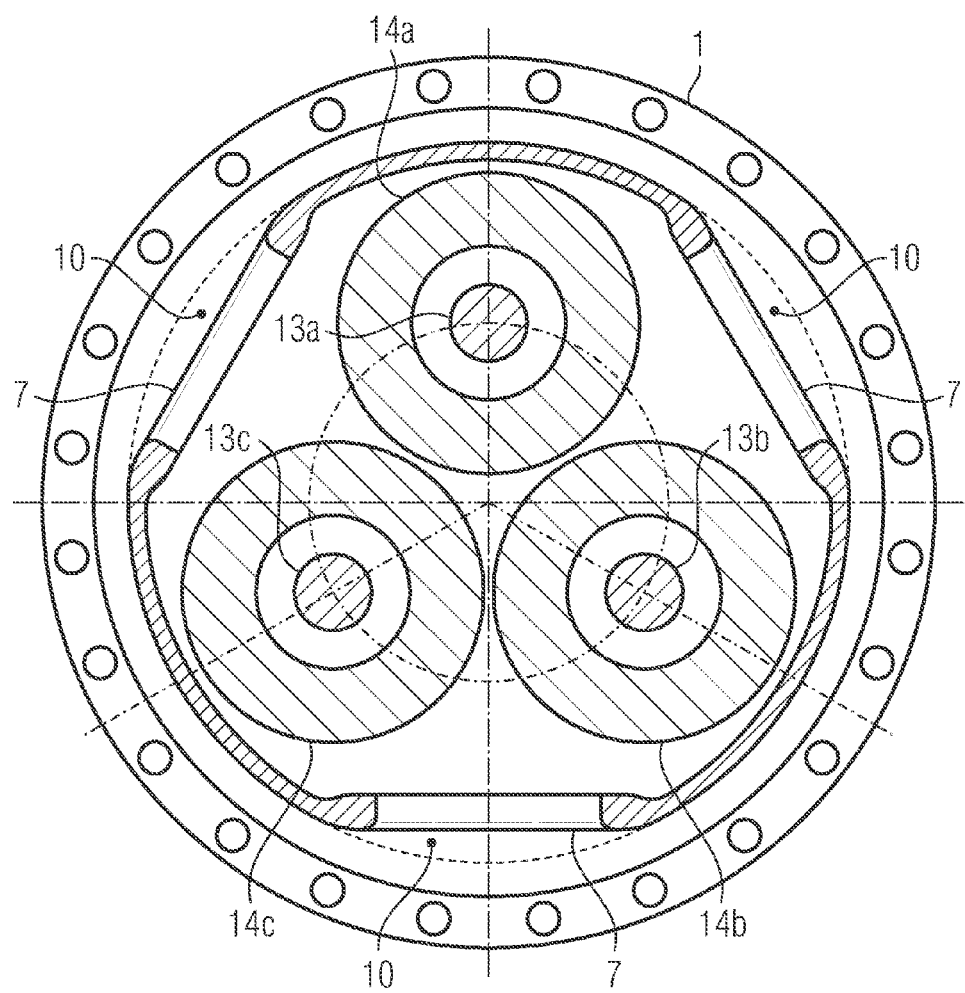
FIG. 3 shows a section through an encapsulation housing casing of the encapsulation housing reducing piece.

FIG. 3 shows a section through the encapsulation housing reducing piece known from FIGS. 1 and 2. In this case, the section plane has been chosen such that the flange openings 7 which are located in the planar zones 5a, 5b, 5c are sectioned. FIG. 3 uses the same viewing axis as that known from FIG. 2. As can be seen, a section of the encapsulation housing reducing piece has an essentially triangular cross section, which is broken at the triangle points by the rotationally symmetrical casing surface sections 6a, 6b, 6c. Reinforcing elements pass through the ideal triangle sides, for robustness reasons. It is possible, for example, to introduce threaded holes like blind holes in these reinforcing elements, by means of which blank flange covers 8 (not illustrated in FIG. 3) which close the flange openings 7 or other closure elements, can be connected in a fluid-tight manner to the encapsulation housing reducing piece.

In comparison to the view known from FIG. 2, it is possible to see that the active conductors 13a, 13b, 13c have been spread out to a circle with a larger diameter. Furthermore, each of the active conductors 13a, 13b, 13c are surrounded by transformer cores 14a, 14b, 14c. The transformer cores 14a, 14b, 14c are, for example, formed from a ferromagnetic material and have a hollow-cylindrical structure. The transformer cores 14a, 14b, 14c can be used to concentrate the surrounding fields when current flows through the active conductors 13a, 13b, 13c. In this case, the transformer cores 14a, 14b, 14c may have various types of shape. For example, it is possible for a plurality of transformer cores 14a, 14b, 14c; 14a', 14b', 14c'; 14a", 14b", 14c" to be pulled onto each of the active conductors 13a, 13b, 13c along the profile of the active conductors 13a, 13b, 13c.

Figure 4:
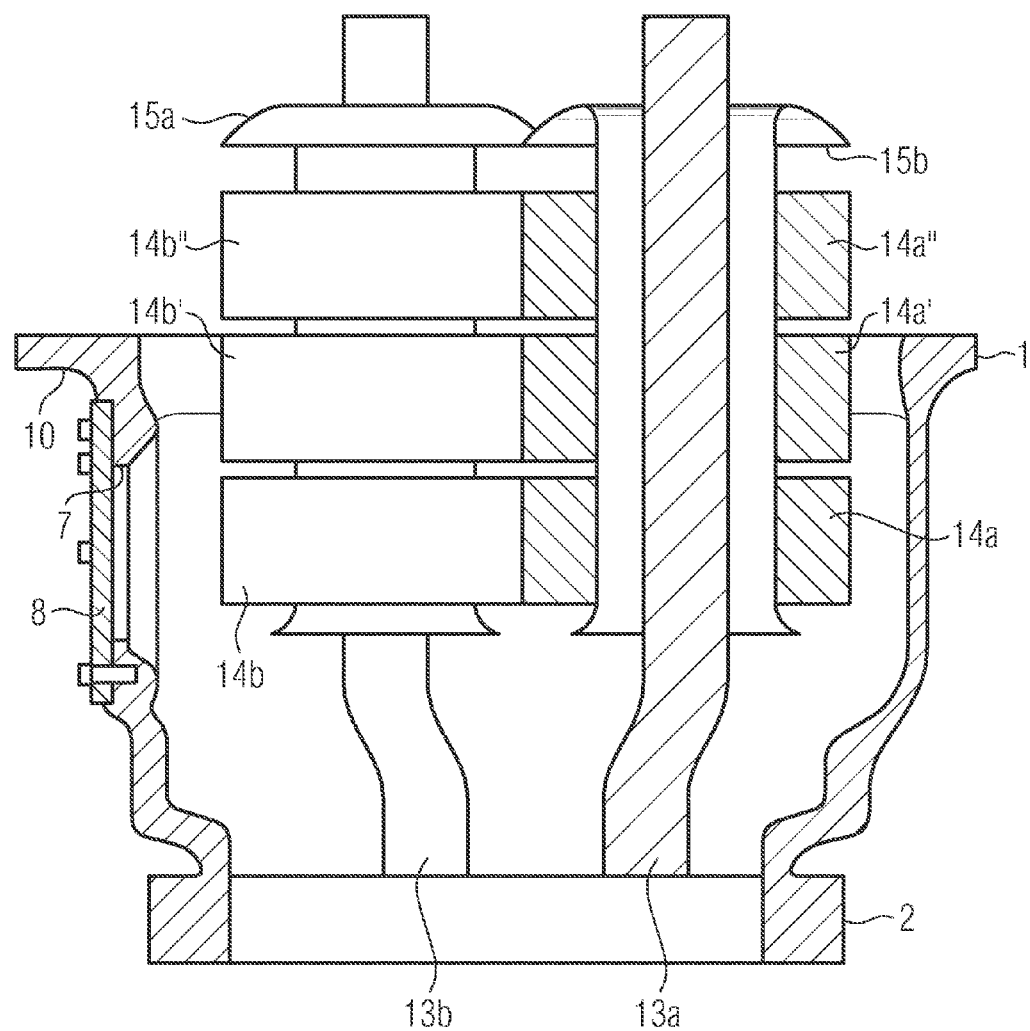
FIG. 4 shows a section through a longitudinal axis of the encapsulation housing reducing piece.

FIG. 4 shows a cross section through the encapsulation housing reducing piece known from FIGS. 1, 2 and 3.

Dielectric shielding elements 15a, 15b are arranged between each of the active conductors 13a, 13b, 13c and the transformer cores 14a, 14a', 14a", 14b, 14b', 14b". FIG. 4 shows the bent profile of the active conductors 13a, 13b, 13c, although one of the active conductors 13c cannot be seen directly, because of the position of the section plane.

Figure 5:
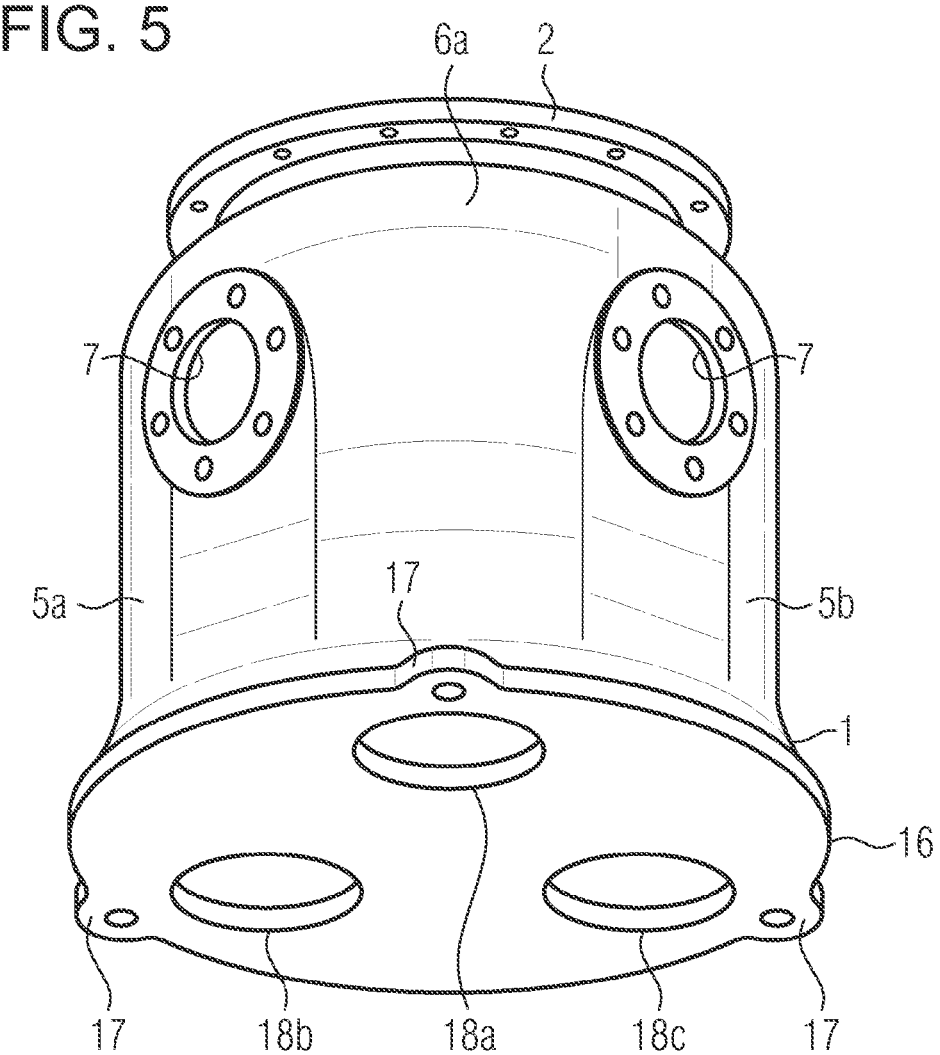
FIG. 5 shows the encapsulation housing reducing piece with a cover on a first flange.

FIG. 5 shows a perspective view of the encapsulation housing reducing piece known from FIGS. 1, 2, 3, 4. In this case, the encapsulation housing reducing piece shown in FIG. 5 has not yet been entirely completed, that is to say the flange openings 7 in the planar zones 5a, 5b, 5c do not have any covering. The annular flange rings which surround the flange openings 7 can be seen.

A cover 16 is flange-connected to the first flange 1. The cover 16 is essentially circular, with the diameter of the cover 16 corresponding to the external diameter of the first flange 1. Radial attachments 17 are provided on the circumference of the cover 16 and overhang the first flange 1. In this case, the number of attachments 17 corresponds to the number of rotationally symmetrical casing surface sections 6a, 6b, 6c. The cover 16 is flange-connected to the first flange, at a fixed angle and in a fluid-tight manner. Recesses which pass through are incorporated in the attachments 17, via which recesses the cover 16 can be held alongside the flange-connected encapsulation housing reducing piece. By way of example, it is possible for this purpose for the attachments 17 to be connected at a fixed angle to a foundation, a supporting frame, or the like.

Figure 6:
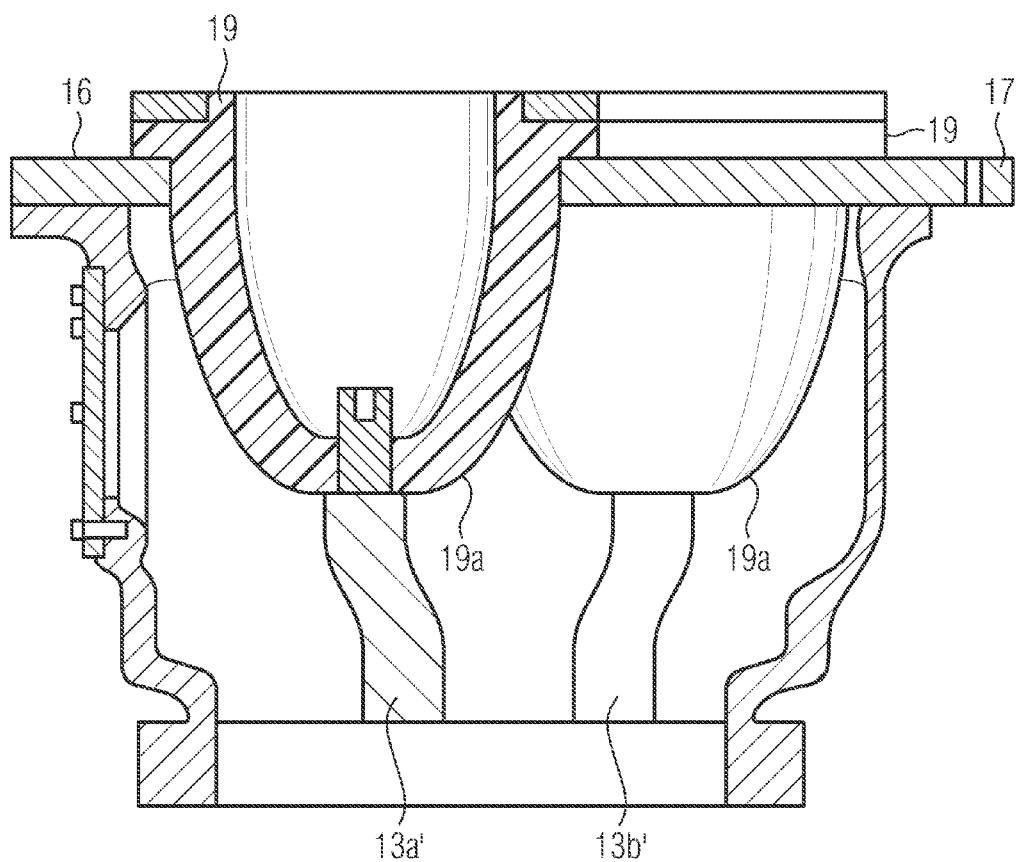
FIG. 6 shows a section through the encapsulation housing with a cover.

The arrangements of three openings 18a, 18b, 18c are also provided in the cover 16. The number of three openings 18a, 18b, 18c corresponds to the number of planar zones 5a, 5b, 5c and the number of rotationally symmetrical casing surface sections 6a, 6b, 6c. The openings 18a, 18b, 18c may be provided in order to connect cable bushings 19 to the cover 16 in a fluid-tight manner, such that the openings 18a, 18b, 18c are closed in a fluid-tight manner (FIG. 6). Active conductors 13'a, 13'b which are located in the interior of the encapsulation housing reducing piece or other encapsulation housing assemblies can be electrically conductively connected via the cable bushings 19 to electrical conductors which are located outside the encapsulation housing reducing piece. These electrical conductors are passed into the interior of the encapsulation housing reducing piece via cables which end in the cable bushings. In this case, it is particularly advantageous for the cable bushing to be in the form of cable plugs, that is to say for the openings 18a, 18b, 18c to be closed by cable sockets 19a, with the cable sockets 19a being part of a fluid-tight wall of the encapsulation housing reducing piece. The cable sockets 19a have electrically insulated sections for this purpose.

The encapsulation housing reducing piece shown in FIGS. 5, 6 has a slightly modified shape from that of the encapsulation housing reducing piece as shown in FIGS. 1, 2, 3, 4. However, the statements relating to FIGS. 1 to 4 can also be applied analogously to the encapsulation housing illustrated in FIGS. 5, 6. Conversely, the statements relating to FIGS. 5, 6 are also applicable to the encapsulation housing reducing piece shown in FIGS. 1 to 4.

The invention claimed is:

1. An encapsulation housing reducing piece, comprising:
a first flange and a second flange, said second flange having a cross section smaller than a cross section of said first flange;
an encapsulation housing casing extending between said first flange and said second flange, said encapsulation housing casing being formed with a plurality of planar zones and casing surface sections arranged rotationally symmetrically between said planar zones, said zones being formed by flats formed on a circular cylindrical casing.

2. The encapsulation housing reducing piece according to claim 1, wherein at least one of said planar zones merges via a bending edge into a circular section that is connected to said first flange.

3. The encapsulation housing reducing piece according to claim 1, wherein said zones are distributed symmetrically about a circumference of said casing surface sections.

4. The encapsulation housing reducing piece according to claim 1, wherein said zones are formed as depressed indentations into a circular cylindrical casing section.

5. The encapsulation housing reducing piece according to claim 1, wherein at least one of said zones is formed with a flange opening.

6. The encapsulation housing reducing piece according to claim 5, which comprises an overpressure protection device disposed to close said flange opening.

7. The encapsulation housing reducing piece according to claim 5, which comprises a measurement line bushing closing said flange opening.

8. The encapsulation housing reducing piece according to claim 5, which comprises a filter cover closing said flange opening.

9. An assembly, comprising two encapsulation housing reducing pieces, each according to claim 1, connected to one another by said first flanges and disposed to jointly bound a fluid space.

10. The encapsulation housing reducing piece according to claim 1, which comprises a cover closing an opening at said first flange, said cover having a plurality of attachments on a circumference thereof, radially overhanging said first flange and enabling the encapsulation housing reducing piece to be supported thereon.

11. The encapsulation housing reducing piece according to claim 10, which comprises cable bushings passing through said cover.

12. The encapsulation housing reducing piece according to claim 1, wherein said first and second flanges are disposed opposite one another.

13. The encapsulation housing reducing piece according to claim 12, wherein said first and second flanges have flange surfaces, said flange surfaces being substantially parallel to one another.

* * * * *